Sept. 22, 1931. J. POLAK Re. 18,202

CASTING MACHINE

Original Filed Aug. 8, 1928 2 Sheets-Sheet 1

INVENTOR:
J. Polak
BY: Marks & Clerk
ATTORNEYS.

Sept. 22, 1931. J. POLAK Re. 18,202

CASTING MACHINE

Original Filed Aug. 8, 1928 2 Sheets-Sheet 2

INVENTOR.

BY: J. Polak

Marks & Clark

ATTORNEYS.

Reissued Sept. 22, 1931

Re. 18,202

UNITED STATES PATENT OFFICE

JOSEF POLÁK, OF PRAGUE, CZECHOSLOVAKIA

CASTING MACHINE

Original No. 1,717,254, dated June 11, 1929, Serial No. 298,329, filed August 8, 1928, and in Czechoslovakia September 1, 1927. Application for reissue filed June 8, 1931. Serial No. 542,989.

This invention relates to a casting machine in which the molten metal is forced out of a cylinder by means of a sliding piston directly into the moulds. The invention consists in this, that the plunger is made removable from the cylinder, for enabling the latter to be filled, while the piston forming the bottom of the cylinder, on which the molten metal poured into the cylinder rests, on the one hand normally closes the connecting passages between the interior of the cylinder and the moulds lying directly next to it and on the other hand, when exerting the casting pressure, rests on the bottom of the cylinder and finally, after the casting operation has been completed and the plunger has been withdrawn, ejects the remaining metal out of the cylinder, at the same time separating the runner in the mould from the rest of the metal.

Owing to this arrangement it is possible to cast with metals having a high melting point since the bottom piston which rests on the bottom of the cylinder enables a great pressure to be exerted on the metal resting on it. An important feature is that with this machine from the time of pouring the metal into the cylinder up to the introduction of the plunger into the latter and the displacement of the plunger the molten metal partly solidifies in its outer layer. Owing to this, when the casting pressure is applied, the partly solidified layer formed around the liquid metal core must first be broken through in order to allow the viscous metal to enter the casting passages.

Figure 1:
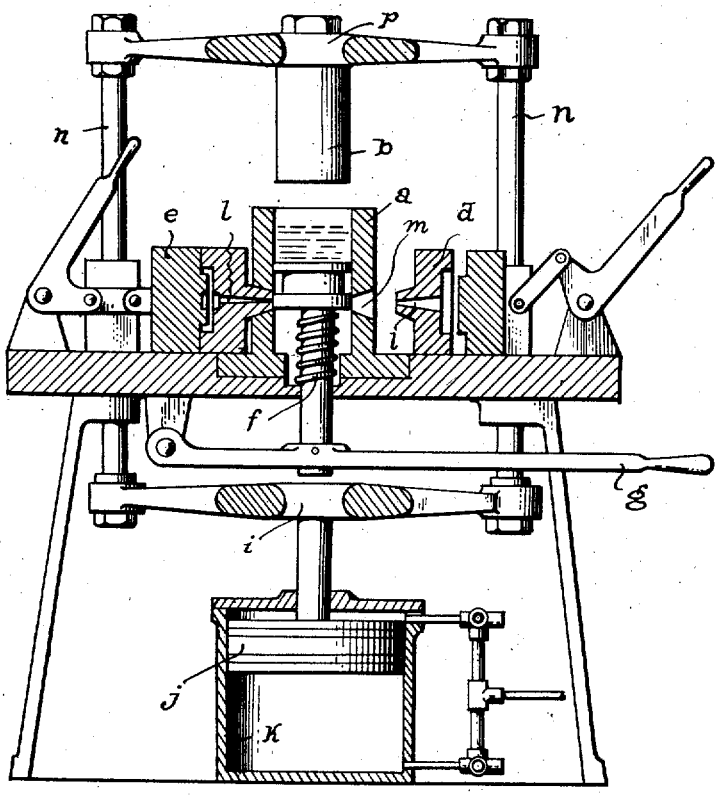
Figure 2:
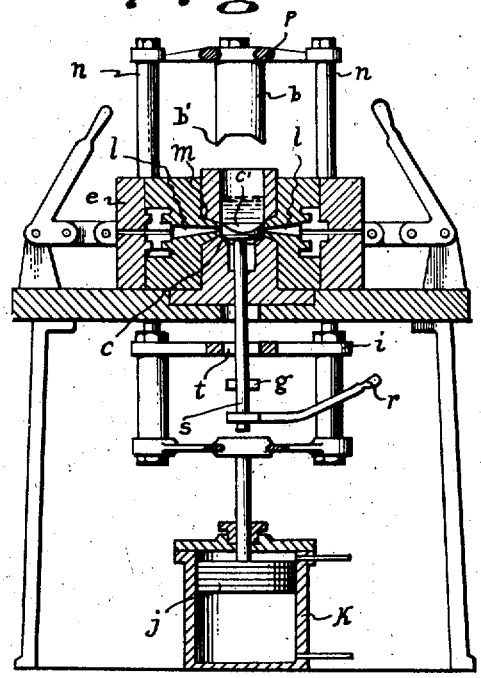
Figure 3:
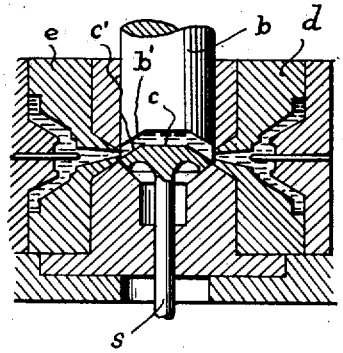
Figure 4:
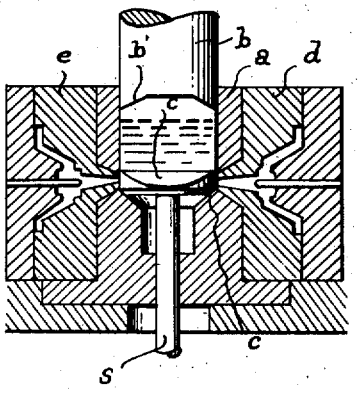

In the accompanying drawings two constructional examples of the moulding machine are shown, Fig. 1 being a vertical section through one constructional form, Fig. 2 a vertical section through the second constructional form and Figs. 3 and 4 showing the plunger and the bottom piston in different operative positions in the cylinder of the second constructional form. In the various figures similar constructional parts bear similar reference letters.

In the constructional form shown in Fig. 1 the moulds *d*, *e* are adapted to be brought up from the side to the cylinder *a* which is open at the top, for introducing the projections on the moulds, which are provided with the passages *l*, into corresponding holes *m* in the wall of the cylinder, in which they fit tightly. In the cylinder *a* a piston *c* is supported by a spring *f* such that it normally shuts off the hole *m* in the cylinder wall or the passage *l* from the interior of the cylinder. The piston rod of the piston *c* is pivotally attached to a pivoted lever *g* so that the piston *c* can either be lowered to the bottom of the cylinder or by moving the lever *g* upwards can eject the remainder of the metal out of the cylinder *a* after the casting operation is completed, at the same time separating the runner which has solidified in the passage *l* from the metal remaining in the cylinder.

The plunger *b* is fixed to the transverse head piece *p* which is guided by rods *n*. The latter are connected by a transverse head piece *i* to the rod of the piston *j* to which motion is imparted in the cylinder *k* by a controlled driving medium.

The machine operates in the following manner:

After the moulds have been brought up against the cylinder *a* (see Fig. 1 to the left) the cylinder is filled with the requisite amount of molten metal, the supported piston *c* closing the inner opening of the passages *l*. On the piston *j* being moved downwards in the cylinder *k* by means of the controlled driving medium, the plunger *b* will directly and the piston *c* indirectly follow this motion, until the piston *c* rests on the bottom of the cylinder *a*. During this part of the operation and during the subsequent downward motion of the plunger *b* a thin outer layer of the molten metal partially solidifies, so that during the subsequent application of pressure by the plunger *b* such a pressure is exerted on the metal that the solidified outer layer is broken through and the metal surrounded by it enters the passage *l* and the moulds *d*, *e*. The piston *j* is thereupon moved in the opposite direction for the purpose of raising the plunger *b* out of the cylinder *a*, and the piston *c* which moves upwards in the same direction through the action of the spring *f*, again shuts off the inner opening of the passage *l*, at the same time separating the runner which solidifies in the passage *l* from the metal remaining in the cylinder, after which, by actuating the lever *g* the remaining metal is completely ejected from the cylinder.

The constructional form shown in Figs. 2, 3 and 4 differs from that described above in this, that the piston used for ejecting the remaining metal out of the cylinder already rests on the bottom of the cylinder, when the molten metal is being introduced into the latter, and remains in that position during the whole of the casting operation. By being turned about its axis the bottom piston establishes the connection between the casting passages which are otherwise shut off by it and the interior of the cylinder. This has the advantage that, during the casting operation, only the plunger has to be axially displaced in the cylinder but need no longer be guided with a sliding fit as it only comes in contact with the metal when a thin layer of the surface of the latter has become relatively solid.

In contradistinction to the constructional form shown in Fig. 1 the piston *c* rests on the bottom of the cylinder *a* while the latter is being filled and during the casting operation. The piston *c* is provided at certain places with grooves *c'* rising from the edge of the piston towards the center.

The rod *s* of the piston *c* extends through the transverse head piece *i* and is provided with an arm *r* by means of which it can be turned. The rod *s* is further provided with a driving member *o* which, when in a certain position, can pass through the slot *t* in the transverse head piece *i* or, on the rod *s* being turned by means of the arm *r*, rests across the slot *t* in the transverse head piece *i* so that the transverse head piece in its upward motion carries the rod *s* with it.

This machine operates in the following manner:

After the moulds *d*, *e* have been brought up against the cylinder *a* the latter is filled with molten metal while the plunger *b* is in the position shown in Fig. 2. The piston *c* closes the casting passages *l* by means of the cylindrical parts of its periphery lying between the grooves *c'*.

The plunger *b* is thereupon moved downwards in the manner already described, during which motion the slot *t* in the transverse head piece *i* is pushed over the driving member *o* on the rod *s*. The rod *s* and with it the piston *c* is thereupon turned at the suitable moment by means of the lever *r* or by means of any suitable mechanism in such a manner that the grooves *c'* in the piston *c* will lie opposite the casting passages *l*. The driving member *o* on the rod *s* will then lie across the slot *t* in the transverse head piece *i*.

The plunger *b* during its further motion will produce a pressure in the column of metal so that finally the liquid metal core will break from the solidified thin outer layer and be forced into the moulds *d*, *e*.

After the casting operation has been completed the plunger *b* moves back again in the manner described above. At the same time the transverse head piece *i* by means of the driving member *o*, which rests across it, carries the piston *c* along with it, whereby the runner in the passage *l* is separated from the metal remaining in the cylinder and the latter is ejected from the cylinder. The rod *s* of the piston *c* is thereupon turned in such a manner that its driving member *o* can pass through the slot *t* in the transverse head piece *i* under the action of gravity on the piston and the rod, whereby the piston *c* is again brought into a position on the bottom of the cylinder in which the casting passages *l* are again shut off from the interior of the cylinder.

During the pressing operation, therefore, the piston *c* only makes a small rotary motion.

As will be seen from the drawings, the plunger *b* may have its end surface formed so as to correspond to the piston *c*. The end surface of the plunger *b* is therefore provided with the ribs *b'* inclined downwards towards the middle. When the piston *c* is in the casting position (Fig. 3), channels are formed by the opposing end surfaces of the plunger *b* and the piston *c*, which directly face the casting passages *l*. This arrangement allows the metal to pass more rapidly from the cylinder to the moulds.

What I claim is:

1. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter and a piston capable of sliding in the cylinder, of shutting off the openings in the cylinder walls during the introduction of the molten metal and of ejecting the superfluous metal remaining in the cylinder after the completion of the casting operation, as and for the purpose set forth.

2. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure, controlled means for withdrawing the plunger from the cylinder for enabling the latter to be filled with the molten metal and a piston capable of sliding in the cylinder, of shutting off the openings in the cylinder walls during the introduction of the molten metal and of ejecting the superfluous metal remaining in the cylinder after the completion of the casting operation, as and for the purpose set forth.

3. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter, a piston capable of sliding in the cylinder and of ejecting the superfluous metal remaining in the cylinder after the casting operation and means for moving the piston in front of the gates of the moulds while the molten metal is being introduced into the cylinder and for allowing it to rest on the bottom of the cylinder during the application of pressure by the plunger, as and for the purpose set forth.

4. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter, a piston capable of sliding in the cylinder for ejecting the superfluous metal remaining in the cylinder after the casting operation and means for rotating the piston about its axis as it rests on the bottom of the cylinder for closing the gates of the moulds during the filling of the cylinder with molten metal and for opening the gates during the casting operation, as and for the purpose set forth.

5. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter, a piston capable of sliding in the cylinder for ejecting the superfluous metal remaining in the cylinder after the casting operation, means for rotating the piston about its axis as it rests on the bottom of the cylinder, depressions on the upper face of the piston, extending from the cylindrical edge upwards and inwards towards the middle thereof and capable of being brought by the rotation of the piston in alignment with the gates of the moulds for establishing communication with the interior of the cylinder during the casting operation and out of alignment with the gates for blocking the said gates while the cylinder is being filled with the molten metal, as and for the purpose set forth.

6. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter, a guided cross head piece for supporting the plunger, a slot in the said cross head piece, a piston capable of sliding in the cylinder, for ejecting the superfluous metal remaining in the cylinder after the casting operation, a piston rod for supporting the said piston extending through the said slot, a driving member on the said piston rod, means for turning the piston rod for causing the driving member to pass through the said slot during the motion of the cross head piece and plunger before the casting operation and for causing the driving member to engage across the slot after the casting operation, whereby during the upward motion of the cross head piece and plunger for opening the cylinder the piston is caused to take part in the said motion, as and for the purpose set forth.

7. A casting machine comprising in combination a cylinder capable of being filled with molten metal, lateral openings in the walls of the cylinder, a plurality of moulds capable of being moved so as to bring their gates up against the said lateral openings, a plunger capable of sliding axially in the cylinder for producing the casting pressure and of being withdrawn from the cylinder while the molten metal is being introduced into the latter, a piston capable of sliding in the cylinder for ejecting the superfluous metal remaining in the cylinder after the casting operation, means for rotating the piston about its axis as it rests on the bottom of the cylinder for closing the gates of the moulds during the filling of the cylinder with molten metal and for opening the gates during the casting operation and raised edges on the face of the plunger, falling away towards the center thereof, capable of forming with the face of the piston channels directed towards the gates of the moulds for the passage of the molten metal from the cylinder into the moulds, as and for the purpose set forth.

8. A casting machine comprising in combination a cylinder capable of being filled with molten metal, said cylinder having a lateral opening in the wall thereof, a mould capable of being moved so as to bring its gate up against the said lateral opening, a plunger capable of sliding axially in the cylinder for producing the casting pressure and of being withdrawn from the cylinder while the molten metal is being introduced into the latter and a piston capable of sliding in the cylinder, of shutting off the opening in the cylinder wall during the introduction of the molten metal and of ejecting the superfluous metal remaining in the cylinder after the completion of the casting operation, as and for the purpose set forth.

9. A casting machine comprising in combination a cylinder capable of being filled with molten metal, said cylinder having a lateral opening in the wall thereof, a mould capable of being moved so as to bring its gate up against the said lateral opening, a plunger capable of sliding axially in the cylinder for producing the casting pressure and of being withdrawn from the cylinder while the molten metal is being introduced into the latter, a piston capable of sliding in the cylinder for ejecting the superfluous metal remaining in the cylinder after the casting operation, means for rotating the piston about its axis as it rests on the bottom of the cylinder, a depression on the upper face of the piston extending from the cylindrical edge upwards and inwards towards the middle thereof and capable of being brought by the rotation of the piston in alignment with the gate of the mould for establishing communication with the interior of the cylinder during the casting operation and out of alignment with the gate for blocking the said gate while the cylinder is being filled with the molten metal, as and for the purpose set forth.

10. A casting machine comprising in combination a cylinder capable of being filled with molten metal, said cylinder having a lateral opening in the wall thereof, a mould capable of being moved so as to bring its gate up against the said lateral opening, a plunger capable of sliding axially in the cylinder for producing the casting pressure and of being withdrawn from the cylinder while the molten metal is being introduced into the latter, a guided cross head piece for supporting the plunger, a slot in the said cross head piece, a piston capable of sliding in the cylinder, for ejecting the superfluous metal remaining in the cylinder after the casting operation, a piston rod for supporting the said piston extending through the said slot, a driving member on the said piston rod, means for turning the piston rod for causing the driving member to pass through the said slot during the motion of the cross head piece and plunger before the casting operation and for causing the driving member to engage across the slot after the casting operation, whereby during the upward motion of the cross head piece and plunger for opening the cylinder the piston is caused to take part in the said motion, as and for the purpose set forth.

11. A casting machine comprising in combination a cylinder capable of being filled with molten metal, said cylinder having a lateral opening in the wall thereof, a mould capable of being moved so as to bring its gate up against the said lateral opening, a plunger capable of sliding axially in the cylinder for producing the casting pressure and of being withdrawn from the cylinder while the molten metal is being introduced into the latter, a piston capable of sliding in the cylinder for ejecting the superflous metal remaining in the cylinder after the casting operation, means for rotating the piston about its axis as it rests on the bottom of the cylinder for closing the gate of the mould during the filling of the cylinder with molten metal and for opening the gate during the casting operation and a raised edge on the face of the plunger, falling away towards the center thereof, capable of forming with the face of the piston a channel directed towards the gate of the mould for the passage of the molten metal from the cylinder into the mould, as and for the purpose set forth.

JOSEF POLÁK.